Sept. 27, 1966  W. H. PETITT  3,275,087
ADJUSTABLE DISC HARROW
Filed Feb. 3, 1965  3 Sheets-Sheet 1

INVENTOR
WILLIAM H. PETITT
BY Semmes & Semmes
ATTORNEYS

Sept. 27, 1966   W. H. PETITT   3,275,087
ADJUSTABLE DISC HARROW
Filed Feb. 3, 1965   3 Sheets-Sheet 2

INVENTOR
WILLIAM H. PETITT
BY Semmes & Semmes
ATTORNEYS

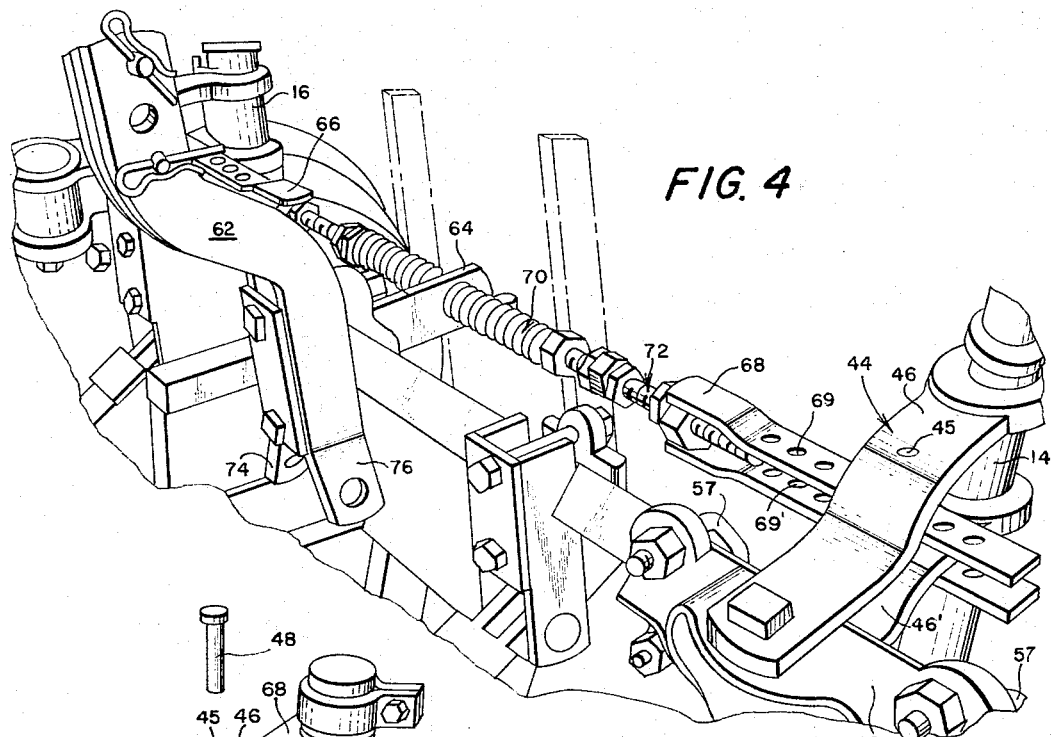
FIG. 4
FIG. 5
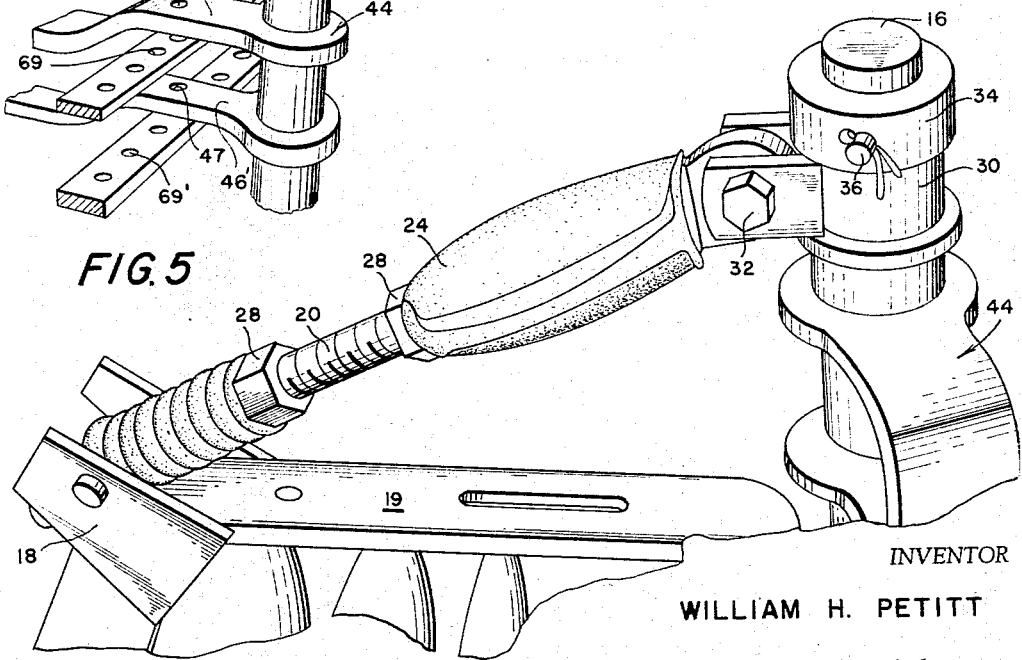
FIG. 6
INVENTOR
WILLIAM H. PETITT
BY Semmes & Semmes
ATTORNEYS

3,275,087
ADJUSTABLE DISC HARROW
William H. Petitt, Chattanooga, Tenn., assignor to The Harriman Manufacturing Company, Chattanooga, Tenn., a corporation of Tennessee
Filed Feb. 3, 1965, Ser. No. 431,492
9 Claims. (Cl. 172—572)

The present invention relates generally to disc harrows and particularly to an adjustable mechanism permitting the disc gangs to move from bush and bog to levee position and vice versa without time consuming disassembly and reassembly.

Numerous inventors have utilized various spring biasing mechanisms functioning as "stabilizing systems" to promote the running of disc gangs in level position. Illustrative of such stabilizing systems are McKahin (U.S. Patent No. 2,062,756); Short (U.S. Patent No. 2,251,500); White (U.S. Patent No. 2,610,453); Oehler et al. (U.S. Patent No. 2,610,454) and Priestley (U.S. Patent No. 2,743,566). However, the long standing problem of permitting changes of position of the disc gangs without time consuming disassembly and reassembly remains unsolved.

The present invention utilizes swivel pin posts set at an angle from the vertical permitting a proper angle (dihedral) for the bush and bog and hilling positions. By virtue of the inclination of the swivel pins and simple pinned adjustment, the disc gang positions can then be easily made within a short time eliminating time consuming disassembly and reassembly.

Accordingly, it is an object of the present invention to provide adjusting features for a disc harrow permitting changes of position of the disc gangs without time consuming disassembly and reassembly.

A further object of the present invention is to permit the disc gangs of a harrow to move from bush and bog to levee position and vice versa in a short time without tilt adjustment.

Still a further object of the present invention is to provide in a disc harrow an adjustment mechanism consisting of swivel pin posts set at an angle from the vertical permitting a proper angle for the bush and bog and hilling positions thus achieving desired changes of position without time consuming disassembly and reassembly.

Additional objects of the present invention will become apparent from the ensuing specification and drawings wherein:

FIG. 4 is a perspective view illustrating in particular the details of the gang adjusting bar and related structure;

FIG. 5 is a perspective view illustrating in particular the attachment of the gang adjusting bar to the lower arm of the kingpin swivel; and FIG. 6 is an enlarged perspective view illustrating the attachment of one of the disc gangs to its related kingpin in rotating relationship therewith.

Figure 1:
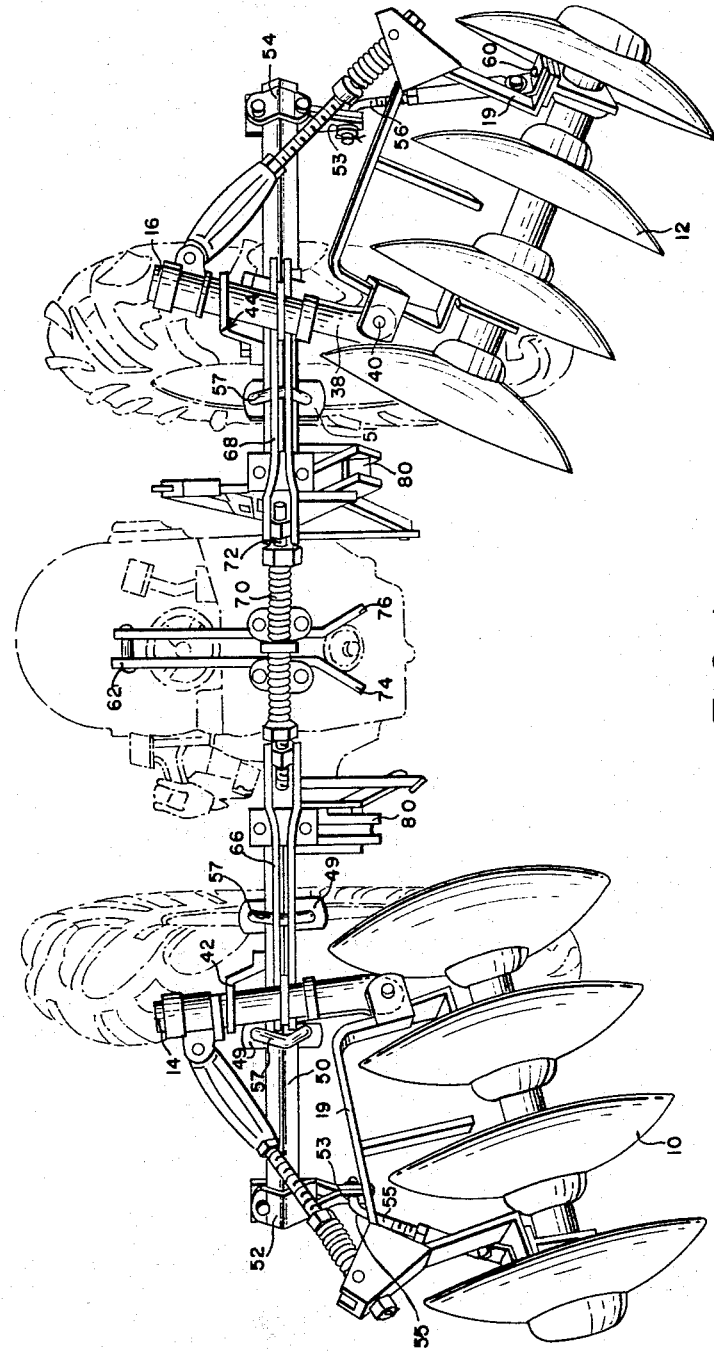
FIG. 1 is a perspective view of the entire disc harrow illustrating the gangs secured in levee position.
Figure 3:
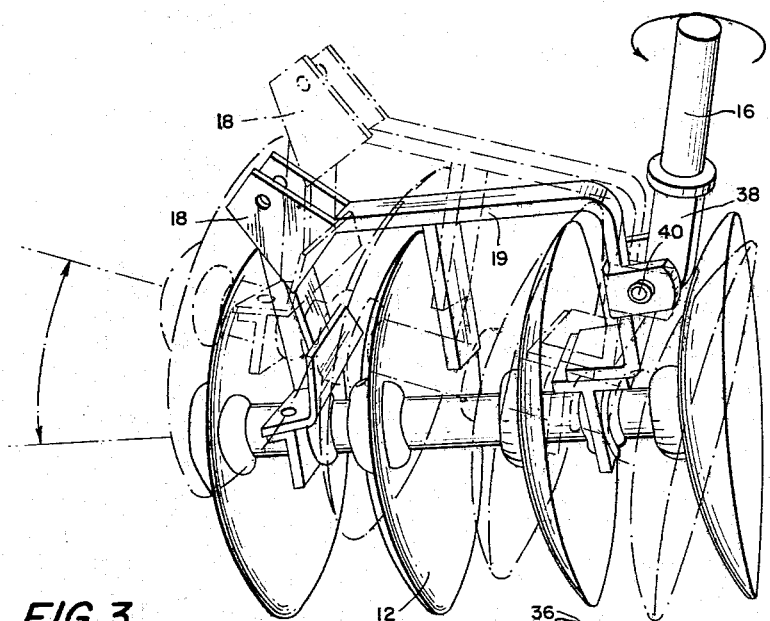
FIG. 3 is a perspective view illustrating the change of position of one set of disc gangs achieved by their rotation about one swivel pin post set at a predetermined angle from vertical.

As seen in FIG. 1, the disc harrow comprises gangs 10 and 12 which are mounted to rotate about swivel pins 14 and 16, respectively, which are set at a predetermined angle from vertical permitting the proper dihedral for the bush and bog and hilling positions.

Figure 2:
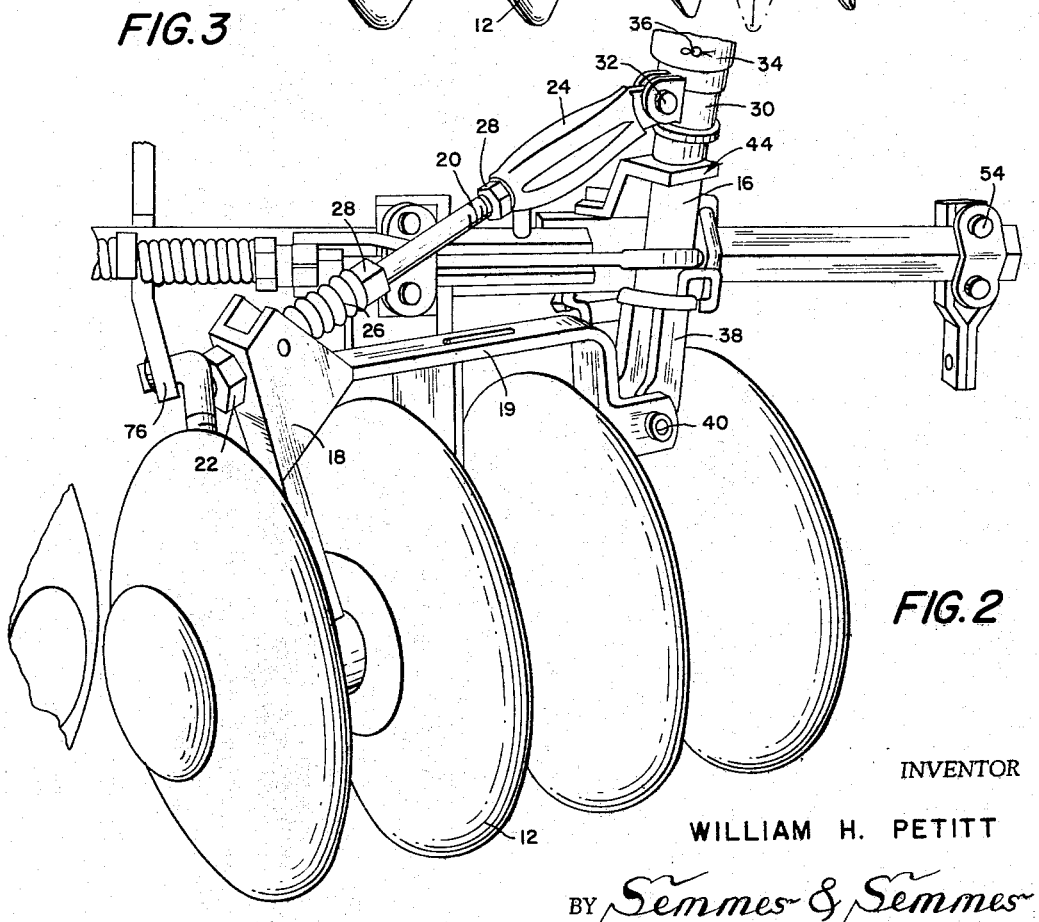
FIG. 2 is an enlarged perspective view of a portion of the disc harrow illustrating the gangs secured in bush and bog position.

Gang 12, for example, as seen in FIGS. 2 and 6, includes a yoke 18 positioned at one end of supporting bracket 19. Yoke 18 contains an opening through which adjusting screw 20 passes and is secured thereto by nut 22. One end of adjusting screw 20 is secured within housing 24 by lock nut 28 while the other end thereof is enclosed by spring member 26 which, in turn, may be adjusted with a second locking nut 28. The upper end of housing 24 is attached to kingpin clamp 30 with the use of tilt adjusting screw 32, the upward movement of kingpin clamp 30 along kingpin 16 being prevented by washer 34 which is secured to kingpin 16 with pin and cotter assembly 36. As particularly seen in FIG. 2, kingpin 16 is attached to supporting bracket 19 with the use of collar 38 and pin 40.

Mounted on kingpins 14 and 16 in rotating relationship are kingpin swivel bundles 42 and 44, as seen in FIG. 1. The details of kingpin swivel bundle 44 are illustrated in FIGS. 4 and 5 wherein upper and lower arms 46 and 46' contain openings 45 and 47, respectively, through which a bolt 48 passes as hereinafter described. The opposite ends of upper and lower arms 46 and 46' are secured to clamp 49 which is positioned along tool bar 50 of the disc harrow.

As indicated, tool bar 50 is horizontally positioned, as seen in FIG. 1, and terminates at each end thereof in tie rod brackets 52 and 54 each containing openings 53 at the bottoms thereof through which may be inserted the upper ends of tie rods 55 and 56. Since the lower ends of tie rods 55 and 56 are attached to supporting frames 19 of gangs 10 and 12, the "levee" position is attained simply by inserting the upper ends of rods 55 and 56 through the openings 53 in tie rod brackets 52 and 54.

Spaced inwardly along tool bar 50 are located brackets 49 and 51, as mentioned above, which are secured to tool bar 50 with the use of conventional U-bolts 57.

In the center of tool bar 50 is located top linkage bracket 62 containing center hitch bracket 64 for suspending gang adjusting bars 66 and 68. Interposed between the ends of gang adjusting bars 66 and 68 is located coiled spring assembly 70 mounted on conventional turnbuckle assembly 72. Top linkage bracket 62 terminates at the bottom thereof in a yoke which includes diverging flange portions 74 and 76 containing openings into which are inserted the upper ends of tie rods 55 and 56 respectively to achieve the bush and bog position, as illustrated in FIG. 2.

As further illustrated in FIGS. 4 and 5, gang adjusting bar 68 includes top and bottom plates having openings 69 and 69' therein. When the desired width of levee is obtained, bolt 48 is passed through openings 45, 69, 47 and 69', respectively.

The following "setting-up and operating instructions" for each disc gang are exemplary of the simplified attachment and adjustment procedures obtainable with the use of the present disc harrow:

(1) Place disc gang 12 in "levee" building position.

(2) Remove pin 40 from kingpin collar 38, then remove collar 38, kingpin clamp 30 and washer 34 from kingpin 16. Assemble kingpin 16 to disc gang 12.

(3) Assemble kingpin swivel bundle 44 on kingpin 16. Assemble washer 34, kingpin clamp 30, kingpin collar 38 and pin and cotter assembly 36.

(4) Remove tilt adjusting screw 32 from tilt adjusting screw housing 24 and clamp 30. Strip adjusting screw 20 of nuts 28 and spring 26, then slide screw 20 up through hole in disc gang yoke 18. Replace the spring 26 and nuts 28 and turn adjusting screw 20 into its housing 24. Bolt adjusting screw housing 24 to kingpin clamp 30.

(5) Loosen nuts on U-bolts 57 and kingpin swivel bundle 44. Slide tool bar 50 through U–bolts 57 and tighten nuts.

(6) Attach tie rod bracket 54 on end of tool bar 50 with nuts to the rear.

(7) Attach hitch bar bracket 80 to tool bar 50 inside kingpin swivel bundle 44 with nuts to the rear, spacing being determined by type of tractor hitch used.

(8) Attach top linkage bracket 62 to center of tool bar 50 with long arms up and nuts to the rear. At the same time straddle ends of gang adjuster bar 68 on lower arm 46' of kingpin swivel bundle 44 and bolt center hitch bracket 64 to top linkage bracket 62. Pin end of gang adjuster bar 68 to lower arm 46' of kingpin swivel bundle 44 using corresponding holes on each end. These series of holes 69, 69' are used for adjusting width of levee desired.

(9) For levee position, assemble tie rod 56 to tie rod bracket 54 and yoke bracket 60.

(10) Bush and bog position may be obtained without removing gang 12 by simply removing tie rod 56, and swinging gang 12 in arc pivoting on kingpin 16. Then reassemble tie rod 56 to hole on near side of flange 76 of top linkage bracket 62.

Manifestly, numerous modifications of the adjustable disc harrow may be envisioned without departing from the scope of the subjoined claims.

I claim:
1. An adjustable disc harrow, comprising:
 (A) a tool bar;
 (B) tie rod brackets mounted on the ends of said tool bar;
 (C) kingpin swivel bundle assemblies mounted on said tool bar and spaced inwardly from said ends thereof;
 (D) adjustable means for variably positioning said bundle assemblies along said tool bar;
 (E) disc gang assemblies mounted on said tool bar, said gang assemblies including king pins set at predetermined angles from vertical and pivotly mounted upon said bundle assemblies;
 (F) linkage bracket means mounted upon said tool bar at the center thereof and including diverging flange portions; and
 (G) tie rods having first ends attached to said gang assemblies and second ends for selectively attaching to said tie rod brackets and said diverging flange portions of said linkage bracket means respectively.

2. An adjustable disc harrow as in claim 1, wherein said kingpin swivel bundle assemblies include first openings therein and said adjustable means includes adjusting bars suspended from said tool bar and located adjacent said bundle assemblies, said adjusting bars including pluralities of second openings for selective alignment with said first openings of said bundle assemblies, and bolt means for insertion through said first openings and preselected openings of said pluralities of second openings respectively.

3. An adjustable disc harrow as in claim 2, wherein said kingpin swivel bundle assemblies include upper and lower arms, said arms containing said first openings therein.

4. An adjustable disc harrow as in claim 3, wherein said adjusting bars include top and bottom members containing said pluralities of second openings therein.

5. An adjustable disc harrow as in claim 4, wherein said tie rod brackets and said diverging flange portions of said linkage bracket means contain holes therein and said second ends of said tie rods contain pin means for selective insertion within said holes respectively.

6. An adjustable disc harrow as in claim 5, including a coiled spring assembly mounted on a turn buckle, said assembly being located between and attached to said adjusting bars.

7. An adjustable disc harrow, comprising:
 (A) a tool bar;
 (B) first and second tie rod brackets mounted on said tool bar;
 (C) linkage bracket means mounted on said tool bar;
 (D) first and second disc gang assembly means mounted on said tool bar, said gang assembly means including first and second kingpins set at predetermined angles from vertical; and
 (E) first and second tie rods having first ends attached to said first and second disc gang assembly means, respectively, and second ends for selectively attaching to said first and second tie rod brackets and said linkage bracket means respectively.

8. An adjustable disc harrow as in claim 7 wherein said first and second disc gang assembly means include adjusting means for variably positioning said first and second kingpins along said tool bar.

9. An adjustable disc harrow as in claim 8, wherein said adjusting means includes first and second kingpin swivel bundle assemblies terminating in upper and lower arms containing first openings therein and adjusting bars suspended from said tool bar and containing pluralities of second openings therein together with bolt means for insertion through said first openings and selected openings of said pluralities of second openings.

References Cited by the Examiner

UNITED STATES PATENTS

| | | | |
|---|---|---|---|
| 1,095,971 | 5/1914 | Swanson | 172—582 X |
| 1,169,127 | 1/1916 | Craddock | 172—600 X |
| 1,216,123 | 2/1917 | Howe | 172—600 X |
| 1,410,144 | 3/1922 | Traphagen | 172—583 |
| 2,749,694 | 6/1956 | Klemm et al. | 172—577 X |

ABRAHAM G. STONE, *Primary Examiner.*

WILLIAM A. SMITH III, *Examiner.*